(12) United States Patent
Chuck et al.

(10) Patent No.: US 10,807,735 B2
(45) Date of Patent: Oct. 20, 2020

(54) METHODS AND APPARATUS TO REDUCE STATIC PRESSURE MEASURING ERROR

(71) Applicant: The Boeing Company, Chicago, IL (US)

(72) Inventors: Chen Chuck, Mercer Island, WA (US); Sho Sato, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 417 days.

(21) Appl. No.: 15/786,341

(22) Filed: Oct. 17, 2017

(65) Prior Publication Data

US 2019/0112069 A1   Apr. 18, 2019

(51) Int. Cl.

| B64D 43/02 | (2006.01) |
| G01L 19/06 | (2006.01) |
| G01L 19/00 | (2006.01) |
| G01P 5/16 | (2006.01) |
| G01K 13/02 | (2006.01) |
| G01P 13/04 | (2006.01) |

(52) U.S. Cl.
CPC ............. *B64D 43/02* (2013.01); *G01K 13/02* (2013.01); *G01L 19/0038* (2013.01); *G01L 19/0046* (2013.01); *G01L 19/0609* (2013.01); *G01P 5/16* (2013.01); *G01P 13/045* (2013.01); *G01K 2013/024* (2013.01)

(58) Field of Classification Search
CPC ........ G01P 13/025; G01P 13/02; G01P 5/165; G01P 5/14; G01P 5/02; G01P 13/0013; G01P 13/0066; G01P 5/005; G01P 5/06; G01P 5/07; G01P 5/16; G01P 5/26; G01P 13/006; G01P 13/045; G01P 5/12; G01P 5/18; G01P 5/20; G01P 13/00; G01P 13/0006; G01P 13/0073; G01P 21/00; G01P 21/025; G01P 3/62; G01P 5/001; G01P 5/04; G01P 5/175; G01P 5/24; G01P 5/245; G01P 5/247; G01W 1/00; G01W 1/08; G01W 1/10; G01W 1/04; G01W 2001/003
USPC ...................................................... 73/170.01
See application file for complete search history.

(56) References Cited

U.S. PATENT DOCUMENTS

| 3,924,464 A | * | 12/1975 | Cummins | ............. G01L 13/025 73/170.16 |
| 4,297,900 A | * | 11/1981 | Brandt, Jr. | ............. G01P 5/165 73/861.66 |
| 6,679,112 B2 | | 1/2004 | Collot et al. | |

(Continued)

FOREIGN PATENT DOCUMENTS

WO   2013028220   2/2013

OTHER PUBLICATIONS

European Patent Office, "European Search Report," issued in connection with European Application No. 18198700.9, dated Mar. 14, 2019, 8 pages.

*Primary Examiner* — Andre J Allen
(74) *Attorney, Agent, or Firm* — Hanley, Flight & Zimmerman, LLC

(57) ABSTRACT

Method and apparatus to reduce static pressure measuring error are disclosed. An example apparatus to measure static pressure includes a static pressure tap including a channel to define an external opening of a vehicle, where the channel extends through a pressure chamber to a pressure sensor disposed within, and a porous material disposed proximate the opening to reduce error in static pressure measurements.

22 Claims, 8 Drawing Sheets

(56) References Cited

U.S. PATENT DOCUMENTS

| | | | |
|---|---|---|---|
| 9,085,665 B1 | 7/2015 | Chang et al. | |
| 9,329,197 B2 | 5/2016 | Sato | |
| 10,520,524 B1* | 12/2019 | Griffin | G01L 9/00 |
| 2001/0028315 A1* | 10/2001 | Frantz | G01P 13/025 |
| | | | 340/945 |
| 2015/0177032 A1* | 6/2015 | Schober | G01P 5/14 |
| | | | 73/861.65 |
| 2015/0268074 A1* | 9/2015 | Sato | G01P 5/14 |
| | | | 73/861.65 |
| 2016/0280391 A1* | 9/2016 | Golly | B64D 43/02 |
| 2016/0305977 A1* | 10/2016 | Genevrier | G01P 5/14 |
| 2017/0089792 A1 | 3/2017 | Russell et al. | |
| 2018/0029719 A1 | 2/2018 | Follet et al. | |

* cited by examiner

METHODS AND APPARATUS TO REDUCE STATIC PRESSURE MEASURING ERROR

FIELD OF THE DISCLOSURE

This disclosure relates generally to measuring static pressure measurements and, more particularly, to methods and apparatus to reduce static pressure measuring error.

BACKGROUND

Typically, static pressure taps are utilized on vehicles, such as aircraft, to measure static pressure during various stages of operations (e.g., flight, idling on the ground, etc.). In particular, the static pressure may be measured to calculate a velocity of the aircraft. In some known examples, an opening of a static pressure tap of a vehicle is positioned along a surface across which air flows (e.g., the air flows perpendicular to the opening). A sensor is disposed within the vehicle at a defined distance from the opening so that the sensor is not substantially affected by a dynamic pressure component that can skew pressure measurements.

SUMMARY

An example apparatus to measure static pressure includes a static pressure tap having a channel to define an external opening of a vehicle, where the channel extends through a pressure chamber to a pressure sensor disposed within, and a porous material disposed proximate the opening to reduce error in static pressure measurements.

An example vehicle includes an external surface, a static pressure tap defining an opening of the external surface and a channel extending to a pressure chamber, a pressure sensor disposed within or proximate the pressure chamber, and a porous material proximate the opening and substantially covering the opening to reduce error associated with the pressure sensor.

An example method of reducing error of a static pressure sensor of a vehicle includes providing porous material proximate an opening of a static pressure tap, where the opening at least partially defines an external surface of the vehicle, and where a channel extends from the opening to a pressure chamber having a pressure sensor disposed within.

Figure 1:
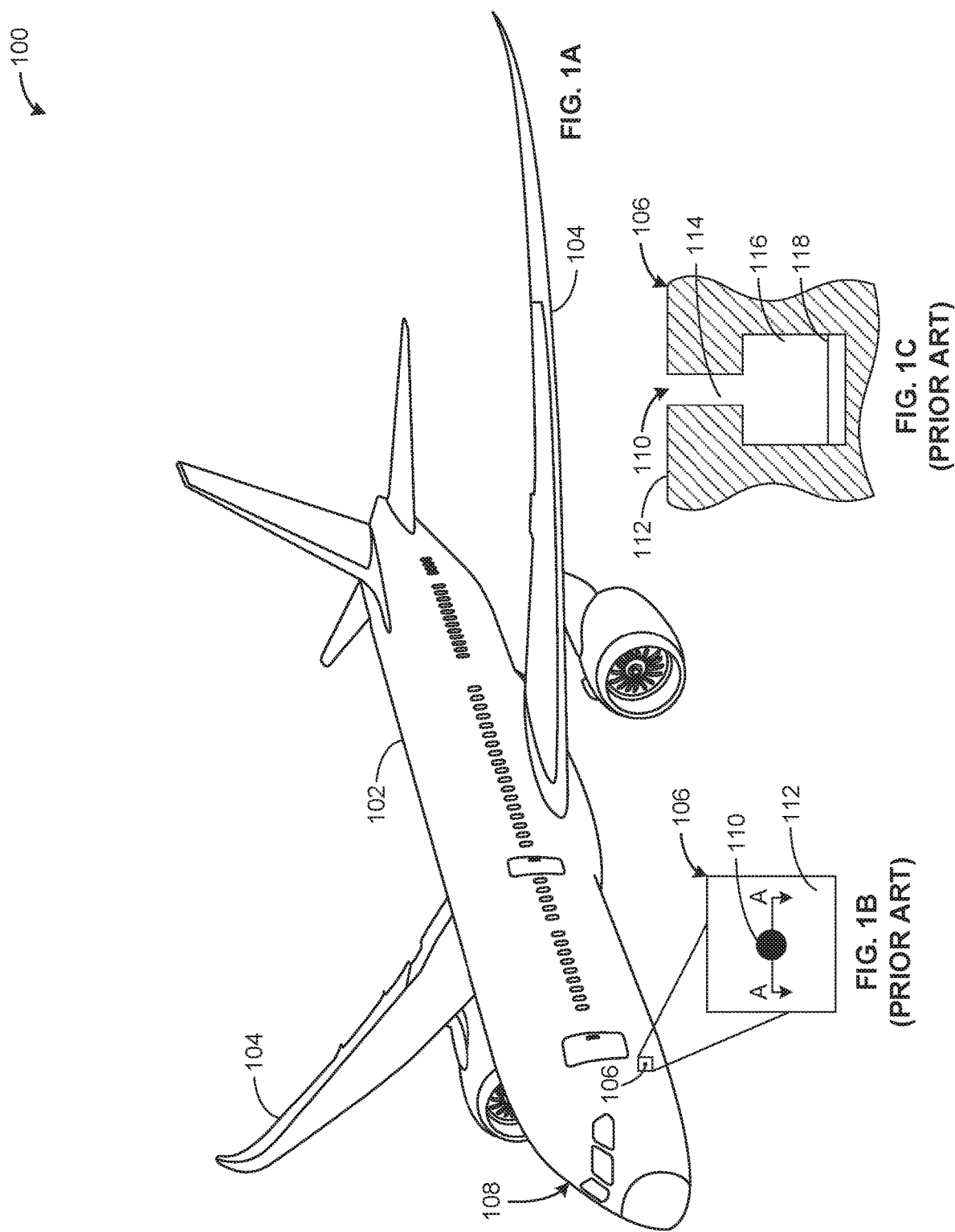
FIG. 1A illustrates an aircraft in which the examples disclosed herein may be implemented.
FIG. 1B is a detailed view depicting a known static pressure tap.
FIG. 1C is a cross-sectional view of the known static pressure tap of FIGS. 1A and 1B.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Static pressure taps are used on vehicles, such as aircraft, to measure a static pressure during various stages of vehicle operations (e.g., flight). In particular, the static pressure is typically measured by a static pressure tap to determine a velocity or airspeed of the vehicle. Thus, an accurate static pressure measurement is vital to make an accurate determination of velocity. Some known static pressure taps allow turbulent airflow to move into the static pressure tap, thereby adversely affecting an accuracy of a pressure sensor disposed within the static pressure tap. In other words, this turbulent airflow moving into the static pressure tap may skew measurements of the pressure sensor.

The examples disclosed herein provide highly accurate static pressure measurements. In particular, the examples disclosed herein utilize porous material disposed proximate an opening of a channel that defines an external opening of a vehicle (e.g., an aircraft), where the channel extends to a pressure chamber having a pressure sensor disposed within. As a result, the porous material reduces error in static pressure measurements made by the sensor, thereby enabling highly accurate determinations of velocity and/or speed, for example.

In some examples, the aforementioned porous material includes a membrane substantially covering the channel to define the external opening. Additionally or alternatively, the porous material includes a porous material plug. In some examples, a porous material plug is coupled to the membrane and extends in a direction generally towards the pressure chamber. Additionally or alternatively, a surface of the porous material is aligned (e.g., flush) with an external surface of a vehicle.

In some examples, the porous material includes a woven fabric material to provide a flow resistance of the porous material between approximately 1 Rayl (centimeter gram second (CGS)) and approximately 1000 Rayl. In some examples, the porous material is composed of at least one of polyether ether ketone (PEEK), polyaryl ether ketone (PAEK) or polyether ketone ketone (PEKK). In some examples, the porous material includes a fabric membrane with a thickness between approximately 0.003 inches and 0.100 inches.

As used herein, the term "static pressure tap" refers to components, an assembly and/or an integrated component that is used to measure a static pressure. As used herein, the term "porous material" refers to a material, composite material, a sponge-like material, a cloth-like material, a cellular material and/or material matrix with openings and/or cellular voids, which may be open or closed (e.g., external openings, internal openings, closed internal volumes, openings extending through a thickness, etc.). As used herein, stating that anything is "aligned" or "flush with" another means that first and second components are approximately between 0 to 10 millimeters (mm) from one another.

FIG. 1A illustrates an example aircraft 100 in which the examples disclosed herein may be implemented. The example aircraft 100 includes a fuselage 102 and wings 104 (e.g., a right wing and a left wing) extending laterally outward from the fuselage 102. The example aircraft 100 also includes a known static pressure tap 106 that is positioned adjacent a nose 108 of the aircraft 100. Alternatively, the static pressure tap 106 may be placed anywhere on the fuselage 102, the wings 104 or any appropriate outboard structure of the aircraft 100.

According to the illustrated example, the static pressure tap 106 is positioned on the aircraft 100 such that air flows across (e.g., perpendicular to) the static pressure tap 106, but does not significantly enter the static pressure tap to mitigate skewing (e.g., contamination, biasing, etc.) by a dynamic pressure component of a static pressure measured at the static pressure tap 106.

FIG. 1B is a detailed view of the static pressure tap 106 depicting an opening 110 of the known static pressure tap 106 of FIG. 1A. The opening 110 of the static pressure tap 106 is a hole or opening that facilitates measurement of a static pressure component by a pressure sensor disposed within the static pressure tap 106. The opening 110 of the known static pressure tap 106 is typically flush with an external surface (e.g., a wall, an external wall) 112 of the aircraft 100.

FIG. 1C is a cross-sectional view of the known static pressure tap 106 of FIGS. 1A and 1B. The static pressure tap 106 includes a channel 114 extending from the opening 110 to a chamber 116. Further, a pressure sensor 118 is disposed within the chamber 116 of the static pressure tap 106.

Figure 2:
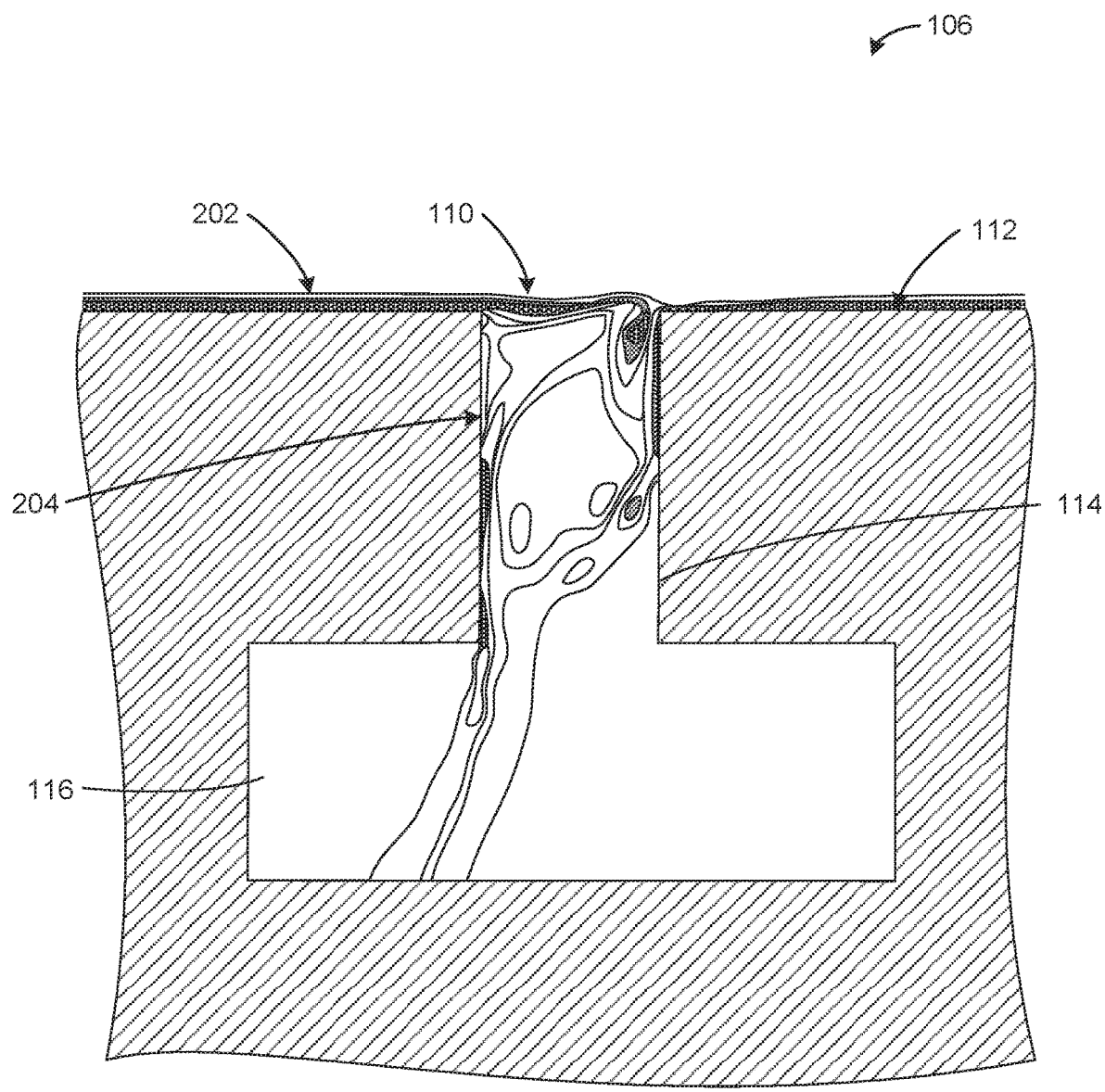
FIG. 2 is a cross-sectional view representing pressure gradients of airflow across the known static pressure tap shown in FIGS. 1A-1C.

FIG. 2 is a cross-sectional view illustrating pressure gradients of example airflow 202 across the static pressure tap 106 shown in FIGS. 1A-1C. The example airflow 202 flows substantially across the opening 110 of the static pressure tap 106. In some instances, the air may also at least partially flow into the channel 114, thereby causing turbulent airflow 204 within the channel 114 as well as the chamber 116, thereby negatively affecting measurements of the pressure sensor 118 by introducing dynamic pressure components. In turn, error associated with the static pressure measurement can affect a velocity or airspeed determination.

Figure 3:
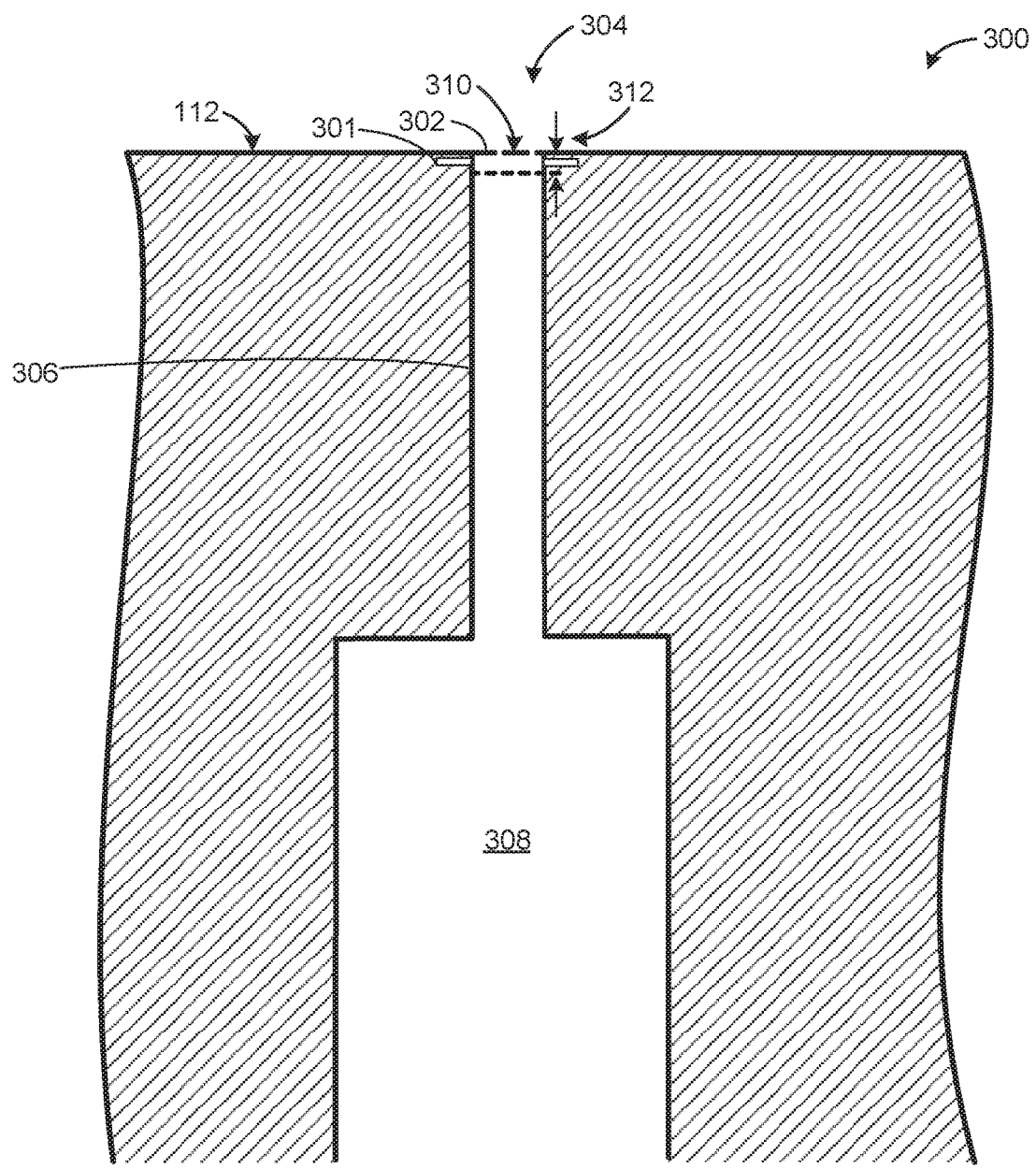
FIGS. 3-7 are cross-sectional views depicting example static pressure taps in accordance with the teachings of this disclosure.

FIG. 3 depicts an example static pressure tap 300 to reduce error in static pressure measurements in accordance with the teachings of this disclosure. The static pressure tap 300 of the illustrated example includes a porous membrane (e.g., a porous material membrane, a membrane made of a porous material) 302 positioned across an opening 304 of the static pressure tap 300 to reduce and/or substantially prevent turbulent airflow within a channel 306 and/or a chamber 308. In some examples, the example porous membrane 302 is positioned such that a surface (e.g., an outer surface) 310 of the porous membrane 302 is flush and/or substantially aligned with the external surface 112 of the example aircraft 100.

In some examples, the porous membrane 302 is offset at a defined distance 312 from (i.e., is not flush relative to) the external surface 112. For example, the porous membrane can be offset in a range from 0 to 20 mm. In such examples, the porous membrane 302 may be offset to facilitate manufacturing and/or installation of the porous membrane 302. The example offset dimensions are only examples and any appropriate offset dimension(s) may be utilized based on application, vehicle design and/or vehicle use, etc.

In some examples, the porous membrane 302 is coupled to and/or installed on or within the static pressure tap 300 via an adhesive, an adhesive tape, a clamp, and/or any other suitable fastener. In some examples, the static pressure tap 300 may include a groove (e.g., an annular groove) 314 into which the porous membrane 302 is at least partially inserted during manufacturing. In some examples, the porous membrane 302 may be retrofitted to existing static pressure taps (e.g., the static pressure tap 106 is retrofitted with the porous membrane 302).

The porous membrane 302 of the illustrated example may have a thickness between approximately 0.003 inches and 0.100 inches. However, the porous membrane 302 may have any appropriate thickness suitable to prevent turbulent airflow within the channel 306 and/or the chamber 308 based on application need(s). In this example, the porous membrane 302 has a flow resistance between approximately 1 Rayl and approximately 1000 Rayl. However, any appropriate flow resistance may be utilized. The porous membrane 302 may be any material having a suitable flow resistance and thickness. In some examples, the porous membrane 302 is selected and/or designed to satisfy other considerations, such as durability requirements, fire-resistance standards, etc. For example, the porous membrane 302 may include thermoplastic fibers, such as PEEK, PAEK and/or PEKK, etc.

To prevent a dynamic pressure component from negatively affecting measurement of a static pressure component, the porous membrane 302 enables air to pass therethrough such that a pressure sensor (e.g., the pressure sensor 118) can accurately measure static pressure and/or a variation (or shift) of the static pressure. In other words, turbulent airflow, which has dynamic pressure components that can skew measurement(s) of the static pressure, is substantially prevented (e.g., fully prevented) from entering the channel 306 and/or the chamber 308.

Figure 4:
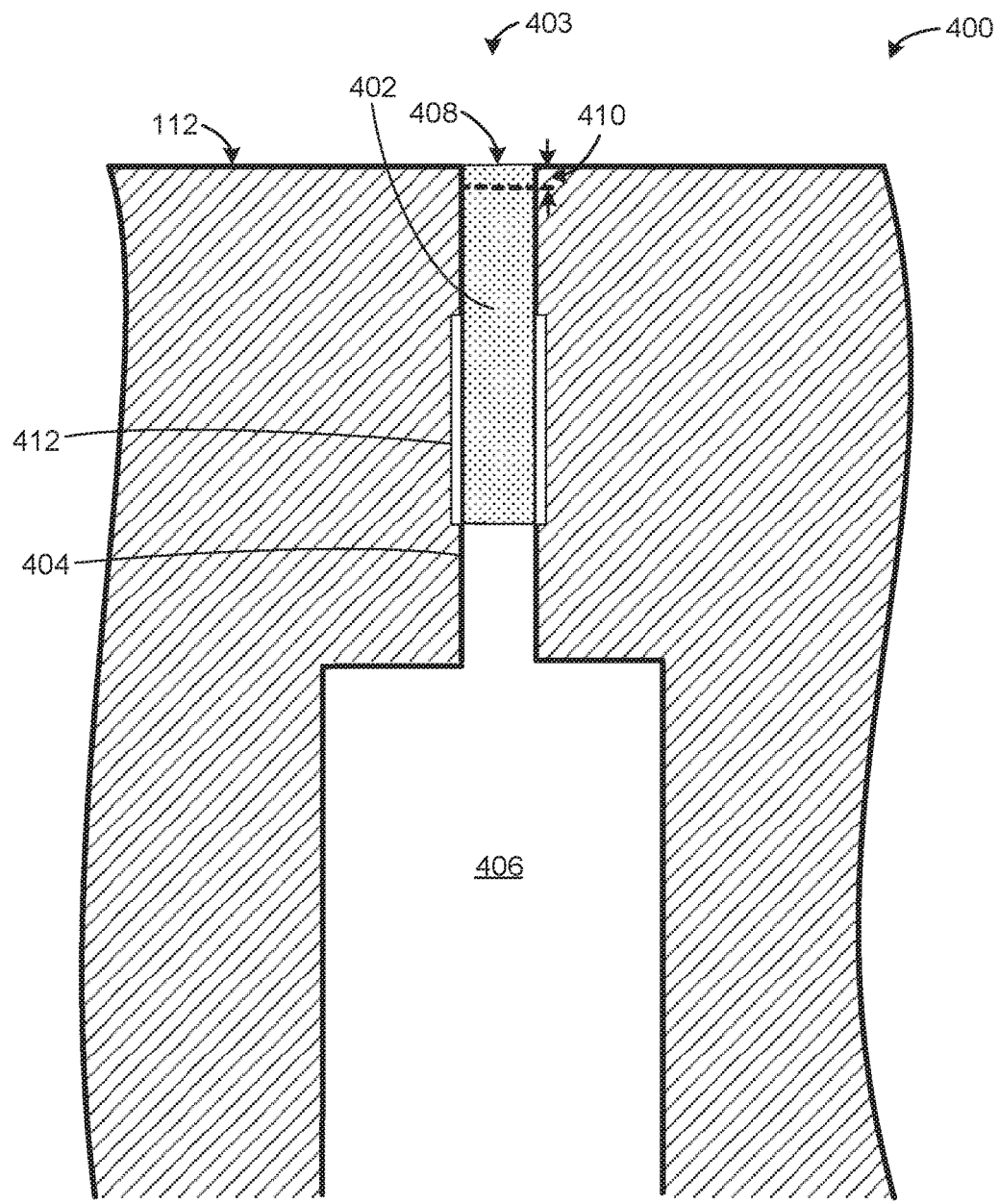

FIG. 4 depicts another example static pressure tap 400 in accordance with the teachings of this disclosure. According to the illustrated example of FIG. 4, the example static pressure tap 400 is similar to the example static pressure tap 300, but includes a porous plug (e.g., a porous material formed into a plug, a porous material plug, etc.) 402 instead of the porous material membrane 302. The example porous plug 402 is disposed adjacent an opening 403 of a channel 404 and extends towards a chamber 406. The example porous plug 402 includes a surface (e.g., an outer surface, an upper surface) 408 that is substantially aligned with (e.g., flush with) the external surface 112 of the aircraft 100.

In some other examples, the surface 408 of the porous plug 402 may be offset by a distance 410 from the external surface 112 (e.g., at an offset distance of 0 to 20 mm). In some examples, the porous plug 402 may be coupled to and/or installed in the static pressure tap 400 using an adhesive, adhesive tape, a clamp, or any other suitable fastener. In some examples, the static pressure tap 400 may include a groove 412 in which at least a portion (e.g., a tab or other protrusion) of the porous plug 402 is inserted during a manufacturing or assembly process.

In this example, the porous plug 402 has a flow resistance between approximately 1 Rayl and approximately 1000 Rayl. In some examples, the thickness of the porous plug 402 corresponds to a porosity of the material. In particular, a length of the porous plug 402 that extends across the channel 404 may be varied based on the porosity, thereby enabling adjustability of the flow resistance in some examples. In some examples, the porous plug 402 is at least partially composed of PEEK, PAEK and/or PEKK, etc.

Figure 5:
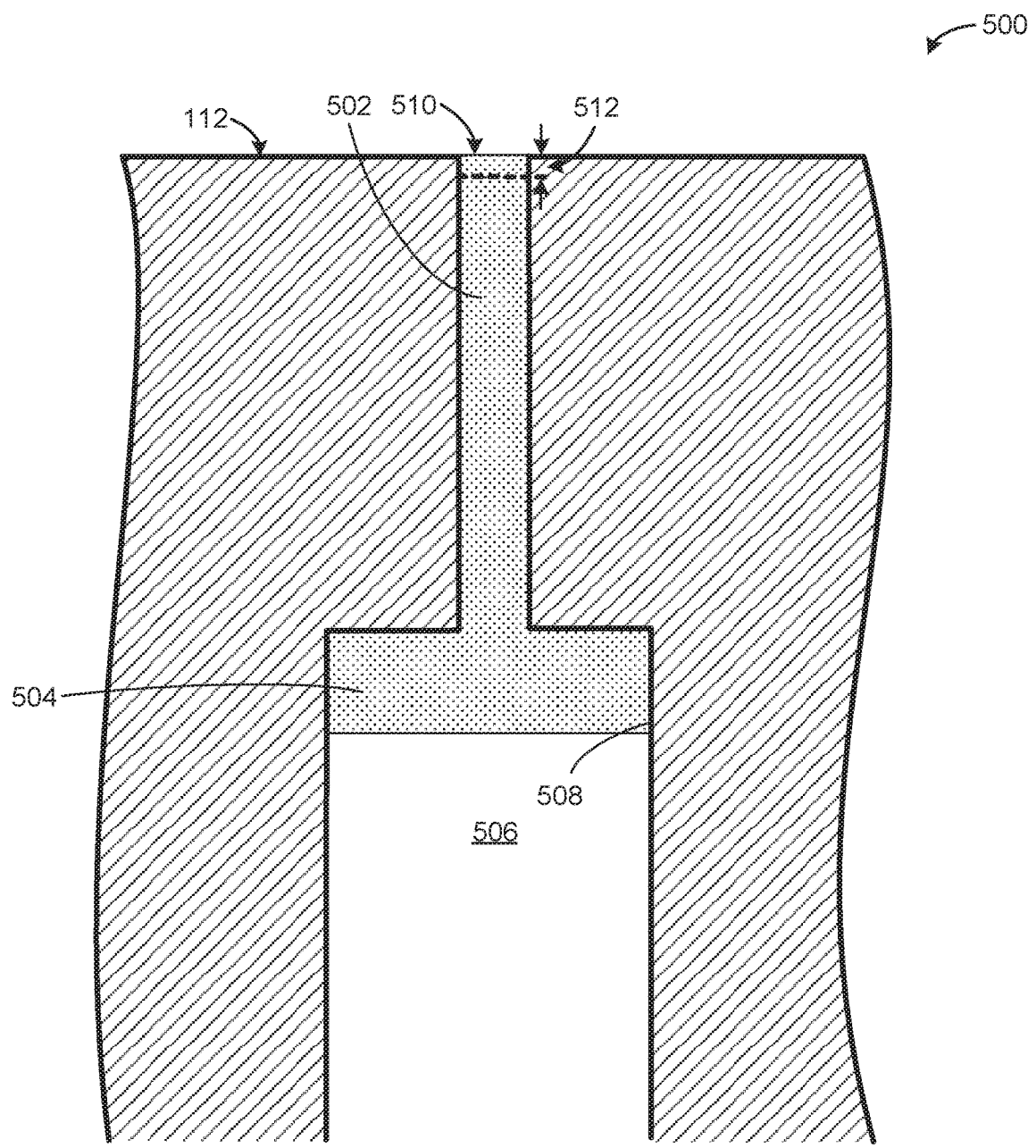

FIG. 5 depicts another example static pressure tap 500 in accordance with the teachings of this disclosure. In contrast to the example static pressure tap 400, the example static pressure tap 500 includes a porous plug (e.g., a porous material plug) 502 with a flange 504 that extends into a chamber 506 of the static pressure tap 500. In this example, the flange 504 extends radially to contact an inner diameter 508 of the chamber 506. In some examples, a surface (e.g., an upper surface, an exterior surface, etc.) 510 of the porous plug 502 may be offset a distance 512 from the external surface 112 (e.g., an offset distance of approximately 0 to 20 mm).

Figure 6:
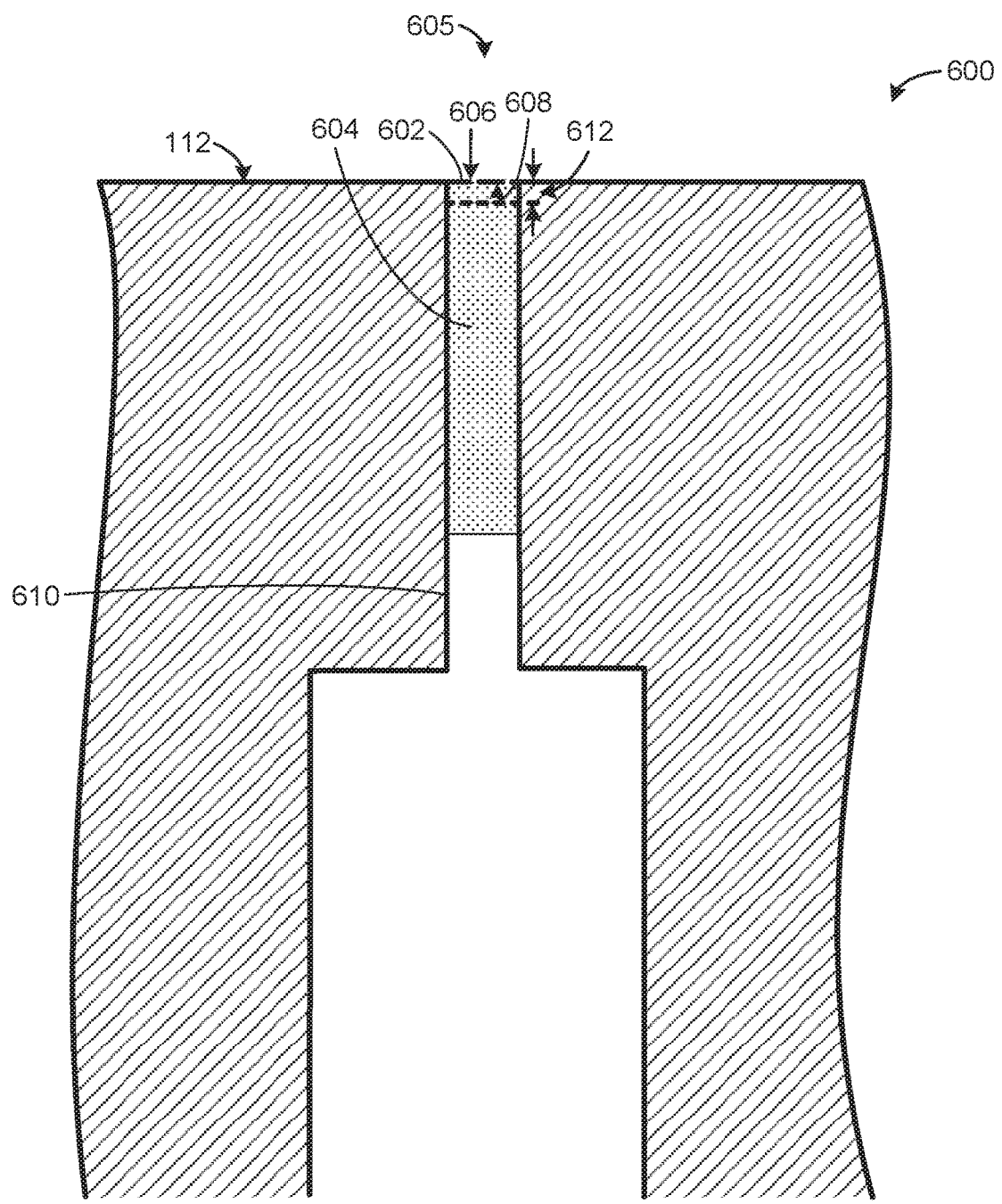

FIG. 6 depicts an example static pressure tap 600 in accordance with the teachings of this disclosure. According to the illustrated example of FIG. 6, a porous membrane 602, which is similar to the example porous membrane 302 of FIG. 3, is implemented in conjunction with a porous plug 604, which is similar to the example porous plug 402 of FIG. 4. In this example, the porous membrane 602 of the illustrated example is coupled to the porous plug 604 and covers an opening 605 such that an outer surface 606 of the porous membrane 602 is flush with the external surface 112. In this example, the porous plug 604 is coupled to and aligned with a second surface (e.g., a bottom surface) 608 of the porous membrane 602 within a channel 610.

In some other examples, the outer surface 606 of the example porous membrane 602 is offset a distance 612 from the external surface 112. In some examples, the porous membrane 602 and the porous plug 604 are made of different materials.

Figure 7:
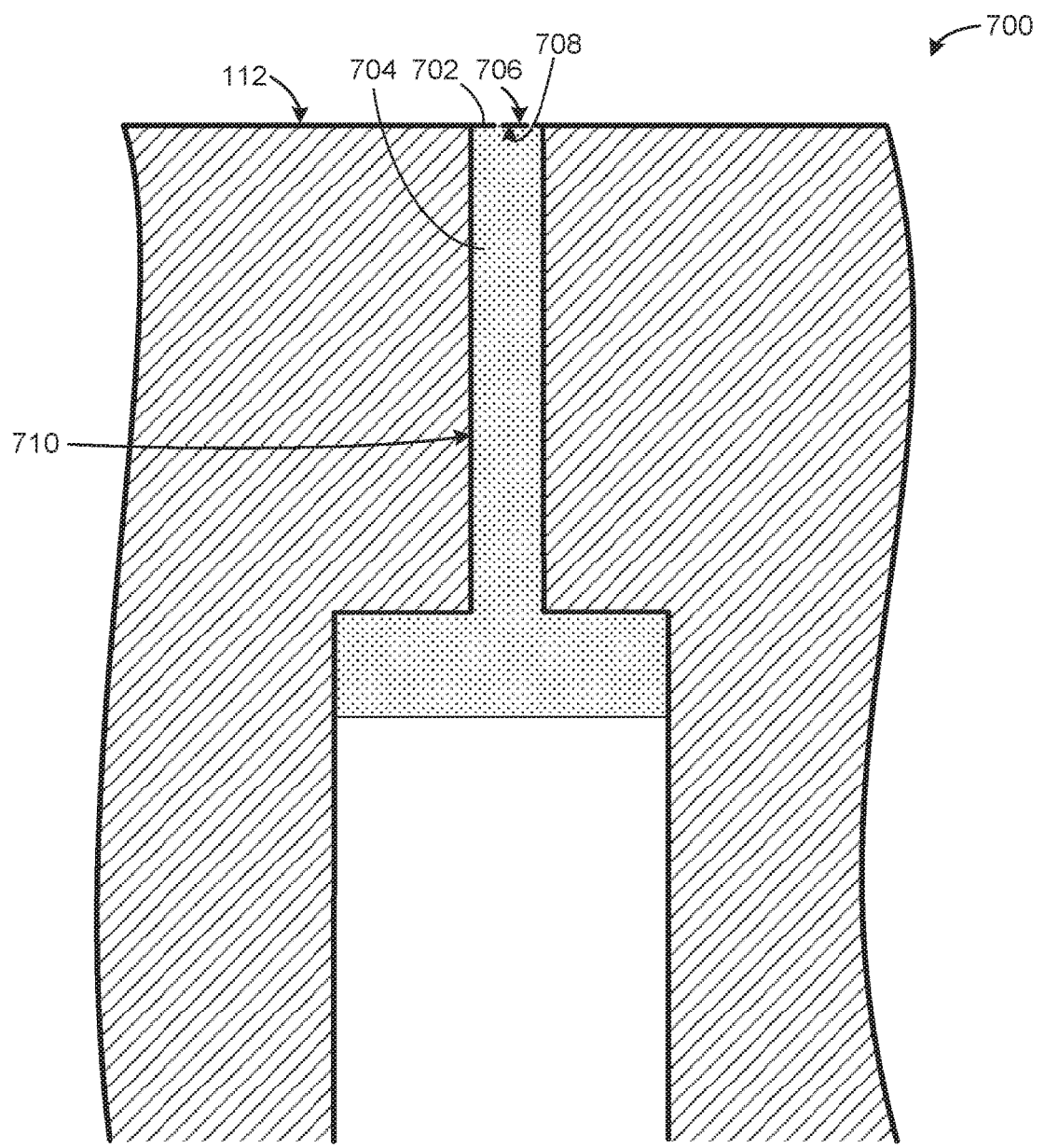

FIG. 7 depicts an example static pressure tap 700 in accordance with the teachings of this disclosure. According to the illustrated example of FIG. 7, a porous membrane 702, which similar to the example porous membrane 302 of FIG. 3, is coupled to a porous plug 704, which is similar to the example porous plug 502 of FIG. 5. The porous membrane 702 includes an outer surface (e.g., an exterior surface, a top surface, etc.) 706 aligned with the external surface 112. In this example, the porous plug 704 is coupled to and aligned with an interior surface 708 (e.g., an interior surface, a bottom surface) of the porous membrane 702 within a channel 710.

In other examples, the porous plug 704 is positioned within the channel 710 and spaced a defined distance from the interior surface 708 of the porous membrane 702. In some other examples, the outer surface 706 of the example porous membrane 702 is offset into the channel 710 and away from the external surface 112 (e.g., offset internally by 0 to 20 mm). Additionally or alternatively, the porous plug 704 is spaced apart or separated from the interior surface 708 of the porous membrane 702. Additionally or alternatively, the porous membrane 702 and the porous plug 704 are composed of different materials.

Figure 8:
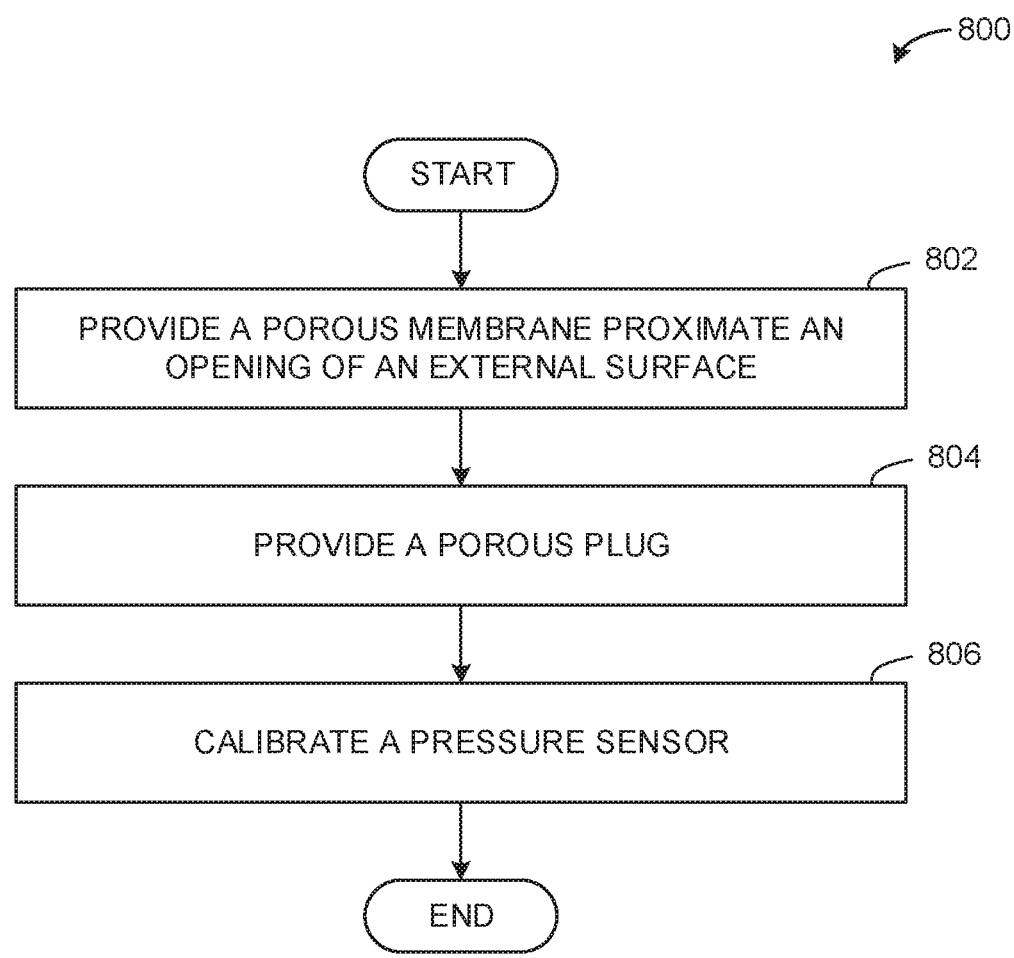
FIG. 8 is a flowchart representing an example method to produce the example static pressure taps shown in FIGS. 3-7.

FIG. 8 is a flowchart representing an example method 800 to produce the example static pressure taps 300, 400, 500, 600, 700 of FIGS. 3-7, respectively.

The example method 800 begins by providing a porous membrane 302, 602, 702 proximate an opening 110, 304 of an external surface 112 of the aircraft 100 within a static pressure tap 300, 600, 700 (block 802). In some examples, the porous membrane 302, 602, 702 is placed or positioned to be flush with the external surface 112. Alternatively, the porous membrane 302, 602, 702 may be offset from the external surface 112 (e.g., by a distance of approximately 0 to 20 mm).

Additionally or alternatively, the porous plug 402, 502, 604, 704 is provided proximate the opening 110 of the external surface 112 (block 804). In some other examples, the porous plug 402, 502, 604, 704 is positioned to be flush with the external surface 112. In some examples, the porous plug 402, 502, 604, 704 is coupled to the porous membrane 302, 602, 702.

In some examples, the pressure sensor 118 of the static pressure tap 300, 400, 500, 600, 700 is then calibrated (block 806) and the process ends.

From the foregoing, it will be appreciated that example methods, apparatus and articles of manufacture have been disclosed that significantly reduce static pressure measurement error in static pressure taps. As a result, vehicle velocity may be measured with high accuracy, for example.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown related to static pressure taps, the examples disclosed herein may be implemented for any appropriate pressure and/or flow measurement device or application. Accordingly, the examples disclosed herein may be implemented in spacecraft (e.g., used during re-entry), watercraft, submersibles, as well as non-vehicle applications (e.g., aerodynamic applications, fins, turbines, windmills, wind tunnels, etc.).

What is claimed is:

1. An apparatus to measure static pressure, the apparatus comprising:
    a static pressure tap including a channel to define an external opening of a vehicle, the channel extending to a pressure chamber to have a pressure sensor disposed within; and
    a porous material plug disposed in the channel and extending along a length of the channel, an end of the porous material plug positioned proximate the external opening, the porous material plug to reduce error in static pressure measurements.

2. The apparatus of claim 1, further including a porous material membrane covering the channel to define the external opening.

3. The apparatus of claim 2, wherein the porous material membrane is coupled to the porous material plug.

4. The apparatus of claim 1, wherein a surface of the porous material plug is aligned with an external surface of a wall in which the static pressure tap is disposed.

5. The apparatus of claim 2, wherein the porous material membrane includes a woven fabric material.

6. The apparatus of claim 1, wherein a flow resistance of the porous material plug is between approximately 1 Rayl and approximately 1000 Rayl (centimeter gram second (CGS)).

7. The apparatus of claim 1, wherein the porous material plug is composed of one or more of PEEK, PAEK, or PEKK.

8. The apparatus of claim 1, wherein the vehicle is an aircraft.

9. A vehicle comprising:
    an external surface;
    a static pressure tap defining an opening of the external surface and a channel extending to a pressure chamber;
    a pressure sensor disposed within or proximate the pressure chamber; and
    a porous material plug having an end proximate the opening and extending along a length of the channel to reduce error associated with the pressure sensor.

10. The vehicle of claim 9, wherein the porous material plug is coupled to a fabric membrane with a thickness between approximately 0.003 inches and 0.100 inches.

11. The vehicle of claim 10, wherein the fabric membrane includes thermoplastic fibers.

12. The vehicle of claim 11, wherein the thermoplastic fibers are composed of one or more of PEEK, PAEK, or PEKK.

13. The vehicle of claim 9, wherein the end of the porous material plug is aligned with the external surface.

14. The vehicle of claim 9, wherein the porous material plug extends into the pressure chamber.

15. The vehicle of claim 9, wherein a flow resistance of the porous material plug is between approximately 1 Rayl and approximately 1000 Rayl (centimeter gram second (CGS)).

16. A method of reducing error of a static pressure sensor of a vehicle, the method comprising providing a porous material plug proximate an opening of a static pressure tap, the opening at least partially defined by an external surface of the vehicle and a channel extending from the opening to a pressure chamber having a pressure sensor disposed therein, the porous material plug extending along a length of the channel.

17. The method of claim 16, further including aligning an end of the porous material plug with the external surface adjacent to the static pressure tap.

18. The method of claim 16, wherein the porous material plug is to be coupled to the static pressure tap using one or more of an adhesive, a clamp, or a fastener.

19. The method of claim 16, wherein the porous material plug is coupled to a membrane.

20. The apparatus of claim 1, wherein the porous material plug includes a flange extending into the pressure chamber.

21. The apparatus of claim 1, wherein the porous material plug extends into an annular groove of the channel.

22. The vehicle of claim 9, wherein the porous material plug is coupled to a porous material membrane.

* * * * *